United States Patent
Watanabe et al.

(10) Patent No.: US 12,033,390 B2
(45) Date of Patent: Jul. 9, 2024

(54) METHOD AND APPARATUS FOR PEOPLE FLOW ANALYSIS WITH INFLOW ESTIMATION

(71) Applicant: Hitachi, Ltd., Tokyo (JP)

(72) Inventors: Yuki Watanabe, San Jose, CA (US); Ravigopal Vennelakanti, San Jose, CA (US); Rahul Vishwakarma, Sunnyvale, CA (US)

(73) Assignee: HITACHI, LTD., Tokyo (JP)

( * ) Notice: Subject to any disclaimer, the term of this patent is extended or adjusted under 35 U.S.C. 154(b) by 91 days.

(21) Appl. No.: 17/511,298

(22) Filed: Oct. 26, 2021

(65) Prior Publication Data

US 2023/0126761 A1 Apr. 27, 2023

(51) Int. Cl.
  *G06V 20/52* (2022.01)
  *G06V 20/40* (2022.01)
  *G06V 20/54* (2022.01)

(52) U.S. Cl.
  CPC .............. *G06V 20/53* (2022.01); *G06V 20/49* (2022.01); *G06V 20/54* (2022.01)

(58) Field of Classification Search
  CPC ......... G06V 20/53; G06V 20/49; G06V 20/54
  See application file for complete search history.

(56) References Cited

U.S. PATENT DOCUMENTS

| | | | | |
|---|---|---|---|---|
| 8,254,633 B1* | 8/2012 | Moon | ..................... | G06V 20/52 382/118 |
| 8,842,881 B2* | 9/2014 | Gao | ....................... | G06T 7/246 382/103 |
| 9,953,245 B2* | 4/2018 | Palacio | ..................... | G08G 1/04 |
| 10,282,852 B1* | 5/2019 | Buibas | ..................... | G06T 7/246 |
| 10,990,923 B1* | 4/2021 | Niranjayan | ............... | G06T 7/20 |
| 11,354,683 B1* | 6/2022 | Shin | ..................... | G06Q 30/0201 |
| 11,488,374 B1* | 11/2022 | Sun | ............................ | G06T 7/20 |
| 2003/0095186 A1* | 5/2003 | Aman | ................. | A63B 24/0021 348/169 |
| 2003/0197612 A1* | 10/2003 | Tanaka | ............... | G08B 13/2462 340/8.1 |
| 2006/0285723 A1* | 12/2006 | Morellas | ................. | G06T 7/254 382/103 |
| 2008/0130949 A1* | 6/2008 | Ivanov | .................... | G06V 20/52 382/103 |
| 2008/0193009 A1* | 8/2008 | Sonoura | .................... | G01S 5/12 342/450 |
| 2009/0059007 A1* | 3/2009 | Wagg | ................... | G11B 27/105 348/157 |

(Continued)

FOREIGN PATENT DOCUMENTS

WO  2015087820 A1  6/2015

*Primary Examiner* — Solomon G Bezuayehu
(74) *Attorney, Agent, or Firm* — Procopio, Cory, Hargreaves & Savitch LLP

(57) ABSTRACT

Example implementations described herein involve an attribute of an inflow source that is assigned to each trajectory in the camera view, which is used for crowd analysis. The inflow source is estimated using techniques of tracking across cameras. If the inflow source is different even if the flow trajectories are the same direction, the trajectories are visualized in different styles. By using the attribute of the inflow source, it is possible to detect changes and anomalies in the crowd that were difficult to detect using the prior art.

15 Claims, 13 Drawing Sheets

(56) References Cited

U.S. PATENT DOCUMENTS

| | | | |
|---|---|---|---|
| 2009/0141940 A1* | 6/2009 | Zhao | G06T 7/248 382/103 |
| 2009/0164059 A1* | 6/2009 | Takeda | B60W 50/04 701/31.4 |
| 2009/0276705 A1* | 11/2009 | Ozdemir | G06V 40/20 715/708 |
| 2012/0020518 A1* | 1/2012 | Taguchi | G06T 7/292 382/103 |
| 2012/0026335 A1* | 2/2012 | Brown | G06T 7/292 382/103 |
| 2013/0208113 A1* | 8/2013 | Yoneji | G08B 13/19608 348/143 |
| 2013/0225199 A1* | 8/2013 | Shaw | G06Q 30/0201 455/456.1 |
| 2013/0343642 A1* | 12/2013 | Kuo | G06V 10/56 382/159 |
| 2016/0063731 A1* | 3/2016 | Yamamoto | G06T 7/292 348/159 |
| 2016/0180196 A1* | 6/2016 | Taylor | G06V 10/50 382/103 |
| 2016/0335502 A1* | 11/2016 | Roshtkhari | G06V 20/52 |
| 2016/0358032 A1* | 12/2016 | Sevin | G06T 7/97 |
| 2017/0148174 A1* | 5/2017 | Kim | H04N 23/90 |
| 2017/0177946 A1* | 6/2017 | Citerin | G06V 40/173 |
| 2017/0177947 A1* | 6/2017 | Citerin | G06T 7/70 |
| 2017/0205832 A1* | 7/2017 | Iimura | H04N 7/185 |
| 2017/0223261 A1* | 8/2017 | Shimizu | H01L 29/66613 |
| 2017/0289526 A1* | 10/2017 | Sasatani | G06T 7/80 |
| 2017/0351906 A1* | 12/2017 | Oguchi | H04N 7/18 |
| 2018/0018504 A1* | 1/2018 | Sotodate | H04N 7/181 |
| 2018/0181813 A1* | 6/2018 | Sun | G06V 40/172 |
| 2018/0314893 A1* | 11/2018 | Tsukamoto | G06T 7/246 |
| 2020/0184230 A1* | 6/2020 | Liu | G06T 7/70 |
| 2020/0193619 A1* | 6/2020 | Danielsson | G06T 7/248 |
| 2020/0327347 A1* | 10/2020 | Arai | H04N 7/181 |
| 2021/0056715 A1* | 2/2021 | Gu | G06V 10/82 |
| 2021/0166041 A1* | 6/2021 | Laganière | G06T 7/194 |
| 2022/0092342 A1* | 3/2022 | Jakobsen | G06V 20/40 |
| 2022/0130055 A1* | 4/2022 | Fisher | G06N 3/045 |
| 2022/0174240 A1* | 6/2022 | Hseush | G06F 16/53 |

\* cited by examiner

FIG. 9

Object table

| Object ID | Image | Time | Camera ID | Trajectory ID | Coordinates | Image feature | ... |
|---|---|---|---|---|---|---|---|
| 1 | | 2021/02/10 11:30:00 | 1 | 1 | [10, 10, 90, 90] | [0.50, 0.58, 0.46,...] | ... |
| 2 | | 2021/02/10 11:30:00 | 1 | 2 | [110, 10, 190, 90] | [0.74, 0.02, 0.46,...] | ... |
| 3 | | 2021/02/10 11:30:10 | 1 | 1 | [110, 110, 190, 190] | [0.45, 0.54, 0.41,...] | ... |
| 4 | | 2021/02/10 11:35:00 | 2 | 3 | [110, 210, 190, 290] | [0.05, 0.13, 0.99,...] | ... |
| 5 | | 2021/02/10 11:35:00 | 2 | 4 | [10, 10, 90, 90] | [0.47, 0.57, 0.42,...] | ... |
| ... | ... | ... | ... | ... | ... | ... | ... |

Trajectory table

| Trajectory ID | Start Time | End Time | Camera ID | Object IDs | ... |
|---|---|---|---|---|---|
| 1 | 2021/02/10 11:30:00 | 2021/02/10 11:33:00 | 1 | [1, 3, ...] | ... |
| 2 | 2021/02/10 11:30:00 | 2021/02/10 11:31:30 | 1 | [2, ...] | ... |
| 3 | 2021/02/10 11:35:00 | 2021/02/10 11:37:00 | 2 | [4, ...] | ... |
| 4 | 2021/02/10 11:35:00 | 2021/02/10 11:36:00 | 2 | [5, ...] | ... |
| ... | ... | ... | ... | ... | ... |

METHOD AND APPARATUS FOR PEOPLE FLOW ANALYSIS WITH INFLOW ESTIMATION

BACKGROUND

Field

The present disclosure is generally directed to tracking systems, and more specifically, for people flow analysis with inflow estimation.

Related Art

Object tracking technologies are roughly classified into "tracking within a camera" and "tracking across cameras" as shown in FIG. 1.

Tracking within a camera is a technology that estimates trajectory of a moving object (e.g. person) from multiple frames captured by the same fixed camera. For example, the Lucas-Kanade method can generate motion vectors of small regions between frames. By observing motion vectors and grouping similar vectors in small areas, the person can be tracked in the same camera view. As long as the target person exists in the camera frame, the person can be tracked, so that the person images of another frame in the same video can be searched. Since the range of image processing can be limited based on the approximate speed of the moving object, computational cost is relatively low. If occlusion or frame-out happens, tracking may fail. However, since images are from same camera conditions, the accuracy of image recognition is relatively high.

On the other hand, motion vectors cannot be used for tracking across cameras (so called re-identification), since images are obtained from different cameras that capture independent spaces. When cameras share the field of view, motion vectors can be used, but accurate camera calibration is required. Therefore, in many cases, tracking across cameras is realized by detecting person regions from camera images, and comparing the person images using image features. For example, the related art method of learning a neural network determines whether two facial images are of the same person. Image matching techniques can be applied to the whole-body image of person. The techniques can determine whether a person in test image is the same person in target image. Re-identification is relatively difficult task since image conditions such as brightness, hue, scale of object, vary depending on camera source. Further, detecting people, extracting image feature and matching requires high computational power (e.g. graphics processing unit (GPU)).

In related art implementations, there is a method and system that searches for similar objects from multiple camera sources. The system extracts image features from multiple salient areas of the moving object. The system can search similar objects in the different time/location by queries given by a user. The system also provides a function that determines query parameters (such as types of salient areas and their combination) by analyzing trajectories in a scene.

SUMMARY

The present disclosure relates to people flow analysis based on object tracking in images. In the related art, a person specified by the user can be tracked, but the task of selecting the target to be tracked must be done manually. However, the use of surveillance video requires functions that automatically produce statistical data on people flow and alert the user by detecting abnormal movement. For example, in the use-case shown in FIG. 2, the tracking within a camera can be used to visualize trajectories of person movement, so that the user can be notified of a person who moves differently from others.

The visualization of trajectories using within-camera tracking results can be implemented using known technologies. For example, as shown in FIG. 3, the direction of the trajectory can be obtained from the coordinates of the start and end points of the tracking, and the style of the trajectory (e.g., shape, color, or thickness) can be defined and visualized according to the direction. This visualization makes it easier for the user to find abnormal movements in the screen. In addition to direction, example implementations can define style of trajectory by the length of tracking (duration), velocity, or acceleration of the tracking target. Furthermore, by combining human recognition technologies, example implementations can define style of trajectory according to the appearance attribute information such as age, gender, or clothing.

On the other hand, in places where movement paths are restricted, such as corridors, it is difficult to find changes or anomalies in the movement of the crowd or to observe the crowd as a group, because most of the trajectories have the same characteristics.

In example implementations described herein, an attribute of an inflow source is assigned to each trajectory in the camera view, which is used for crowd analysis. The inflow source is estimated using techniques of tracking across cameras. FIG. 4 illustrates the visualization of trajectories appearing in the central camera view according to the inflow sources, in accordance with an example implementation. If the inflow source is different even if the flow trajectories are the same direction, the trajectories are visualized in different styles.

By using the attribute of the inflow source, it is possible to detect changes and anomalies in the crowd that were difficult to detect using the related art. For example, if the trajectory style is defined by the direction in the camera view as shown in FIG. 5, "Scene A" and "Scene B" appear to have little difference. On the other hand, by using the inflow source attribute, it can be shown that in "Scene A", there are more crowds coming from the location of Camera 2, and in "Scene B", there are more crowds coming from the location of Camera 1. This makes it possible to detect changes in the situation. Further, by combining this visualization with the analysis of the trajectories within a camera, the cause of the change can be traced.

Aspects of the present disclosure can involve a method which can involve detecting and tracking a plurality of persons from images from a plurality of cameras; extracting image features from the detected and tracked plurality of persons from the images from the plurality of cameras; storing the extracted image features with information associated with the plurality of cameras into a database; searching the database for each of the plurality of persons detected from images from another camera; for the each of the plurality of persons detected from the images from the another camera being within a threshold of similarity of the one of the plurality of persons from the images of one of the plurality of cameras, updating an inflow source estimation of the each of the plurality of persons based on a camera identifier of the one of the plurality of cameras, wherein the inflow source estimation is representative of a trajectory taken by the each of the plurality of persons from a first field of view of the one of the plurality of cameras through a second field of view of the another camera; and providing a visualization of the inflow source estimation of the each of the plurality of persons based on the camera identifier of the one of the plurality of cameras.

Aspects of the present disclosure can involve a computer program, storing instructions which can involve detecting and tracking a plurality of persons from images from a plurality of cameras; extracting image features from the detected and tracked plurality of persons from the images from the plurality of cameras; storing the extracted image features with information associated with the plurality of cameras into a database; searching the database for each of the plurality of persons detected from images from another camera; for the each of the plurality of persons detected from the images from the another camera being within a threshold of similarity of the one of the plurality of persons from the images of one of the plurality of cameras, updating an inflow source estimation of the each of the plurality of persons based on a camera identifier of the one of the plurality of cameras, wherein the inflow source estimation is representative of a trajectory taken by the each of the plurality of persons from a first field of view of the one of the plurality of cameras through a second field of view of the another camera; and providing a visualization of the inflow source estimation of the each of the plurality of persons based on the camera identifier of the one of the plurality of cameras. The instructions can be stored on a non-transitory computer readable medium and executed by one or more processors.

Aspects of the present disclosure can involve a system which can involve means for detecting and tracking a plurality of persons from images from a plurality of cameras; means for extracting image features from the detected and tracked plurality of persons from the images from the plurality of cameras; means for storing the extracted image features with information associated with the plurality of cameras into a database; means for searching the database for each of the plurality of persons detected from images from another camera; for the each of the plurality of persons detected from the images from the another camera being within a threshold of similarity of the one of the plurality of persons from the images of one of the plurality of cameras, means for updating an inflow source estimation of the each of the plurality of persons based on a camera identifier of the one of the plurality of cameras, wherein the inflow source estimation is representative of a trajectory taken by the each of the plurality of persons from a first field of view of the one of the plurality of cameras through a second field of view of the another camera; and means for providing a visualization of the inflow source estimation of the each of the plurality of persons based on the camera identifier of the one of the plurality of cameras.

Aspects of the present disclosure can involve an apparatus, involving a processor, configured to detect and track a plurality of persons from images from a plurality of cameras; extract image features from the detected and tracked plurality of persons from the images from the plurality of cameras; store the extracted image features with information associated with the plurality of cameras into a database; search the database for each of the plurality of persons detected from images from another camera; for the each of the plurality of persons detected from the images from the another camera being within a threshold of similarity of the one of the plurality of persons from the images of one of the plurality of cameras, update an inflow source estimation of the each of the plurality of persons based on a camera identifier of the one of the plurality of cameras, wherein the inflow source estimation is representative of a trajectory taken by the each of the plurality of persons from a first field of view of the one of the plurality of cameras through a second field of view of the another camera; and provide a visualization of the inflow source estimation of the each of the plurality of persons based on the camera identifier of the one of the plurality of cameras.

BRIEF DESCRIPTION OF DRAWINGS

FIG. 9 illustrates an image database configuration, in accordance with an example implementation.

DETAILED DESCRIPTION

Figure 1:
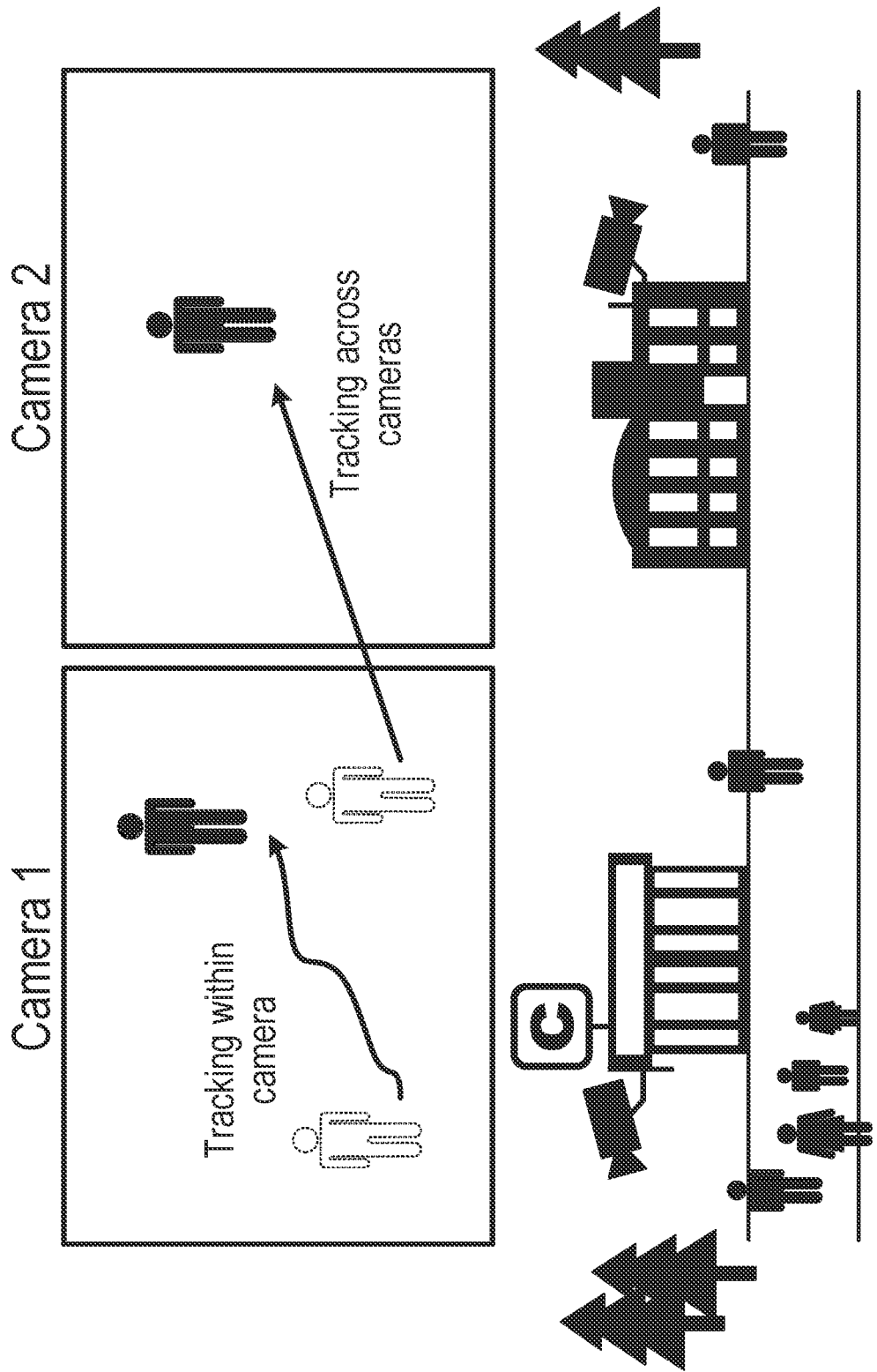
FIG. 1 illustrates an example of tracking within a camera and tracking across cameras.
Figure 2:
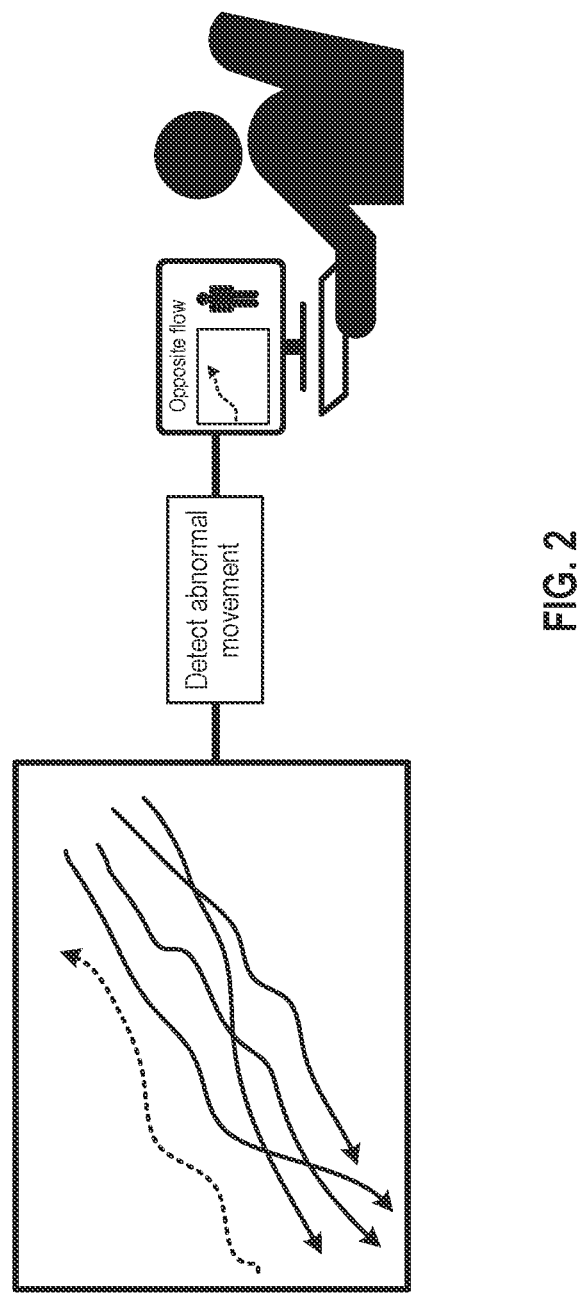
FIG. 2 illustrates an example use case for tracking within a camera.

The following detailed description provides details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or administrator control over certain aspects of the implementation, depending on the desired implementation of one of ordinary skill in the art practicing implementations of the present application. Selection can be conducted by a user through a user interface or other input means, or can be implemented through a desired algorithm. Example implementations as described herein can be utilized either singularly or in combination and the functionality of the example implementations can be implemented through any means according to the desired implementations.

Figure 6:
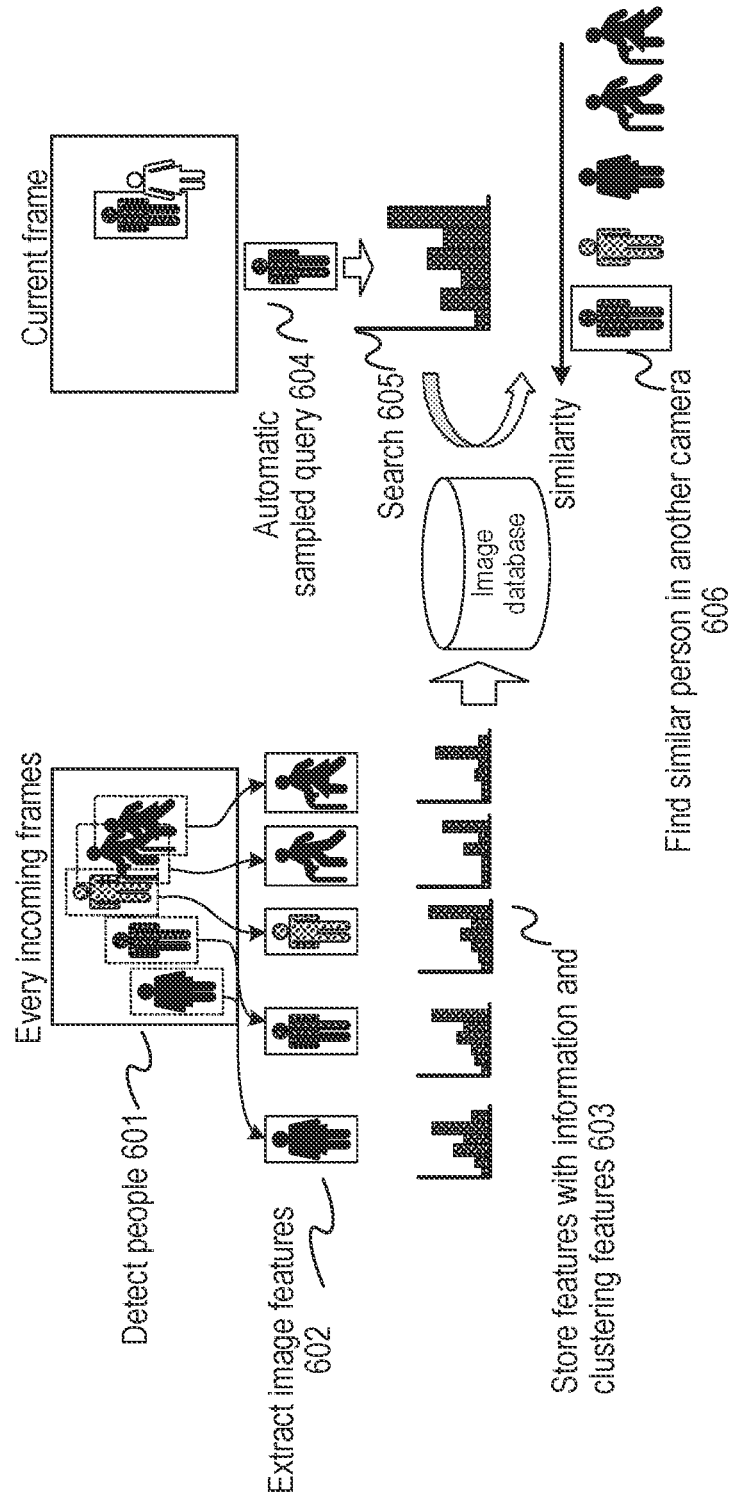
FIG. 6 illustrates the process of inflow source estimation, in accordance with an example implementation.

FIG. 6 illustrates the process of inflow source estimation, in accordance with an example implementation. In the example implementations described herein, inflow sources are estimated by tracking across cameras, and tracking across cameras can be implemented using similar-image search techniques. At 601, the system detects people in an input camera image and track person between frames. Then at 602, the system extract image features from person images. Image classification such as person attributes (e.g., to estimate gender, age, etc.) can be executed to obtain additional information for the person image. This process is performed for all camera inputs connected to the system. Person images, image features, and additional information such as clustering features are linked and stored to image database at 603. Further, the system can perform clustering of feature vectors to process high-speed similar-image search.

In addition to above registration process, when the system receives a request for inflow source estimation from a user, it extracts the people who appear in the camera view and the time range specified by the user as queries of similar-image search. The system can choose the best shot of the person by using the tracking information within the camera at 604. For example, the system can use the confidence score of person detection module, occlusion, size of the person image, and so on, to find the best shot. The search results 605 are filtered by similarity threshold, and information attached to the person images are obtained at 606. Using the information regarding the camera from which the person was taken, if a person image taken by another camera is found, that camera is assumed to be the inflow source of the query person. The estimated inflow information is attached to the trajectory of the person as an attribute. The system repeats the above process for each extracted query.

Figure 7:
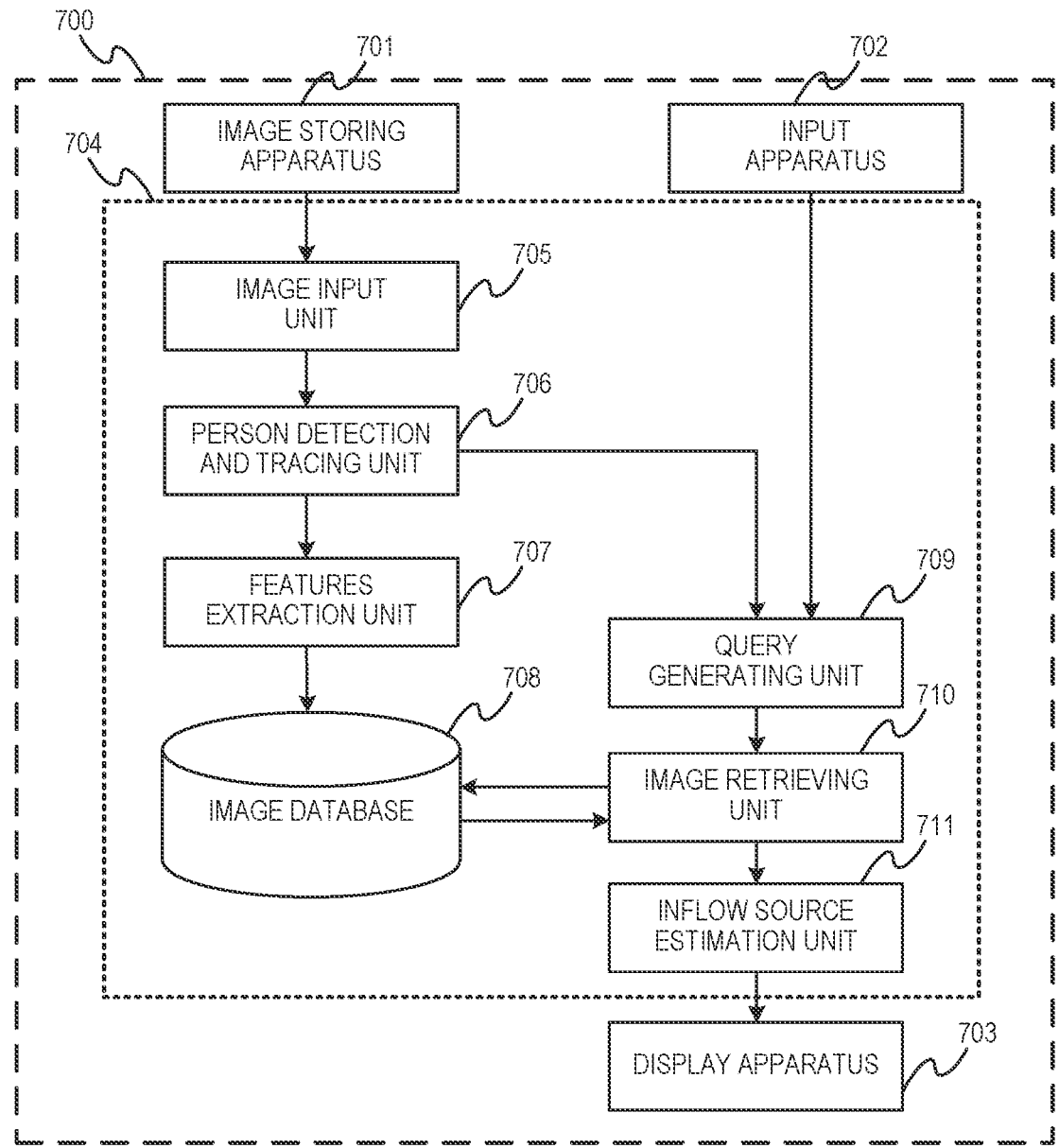
FIG. 7 illustrates an overall system configuration, in accordance with an example implementation.

FIG. 7 illustrates an overall system configuration 700, in accordance with an example implementation. In example implementations described herein, there are image storing apparatuses 701 such as cameras and input apparatuses 702 such as keyboards, touchscreens, and other input devices that is configured to provide query inputs to the hardware system 704 in accordance with the desired implementation. Image storing apparatuses 701 provides images (e.g., video or image feedback) to image input unit 705 which can involve a physical memory buffer for processing by the other units of the system through a physical processor such as a central processing unit (CPU).

Person detection and tracing unit 706 involves software configured to detect people and trace their movement pathways from the images in the image input unit 705. Features extraction unit 707 is configured to extract features from the people detected from person detection and tracing unit 706 to classify the detected people in the images. The features and the associated detected people are stored in the image database 708.

Query generating unit 709 is configured to take in query inputs from input apparatuses 702 to form a query for accessing image database 708. Such query inputs can be in the form of selecting people from displayed images as displayed by display apparatus 703 through a mouse, keyboard, stylus, or so on in accordance with the desired implementation. Query inputs can also be provided by person detection and tracing unit 706 in an automatic sampling process. The forming of queries by query generating unit 709 can involve features extracted from the selected people on the displayed images, or otherwise in accordance with the desired implementation.

Image retrieving unit 710 is configured to submit the formed query from query generating unit 709 to retrieve candidate people from the image database 708 corresponding to the formed query.

Figure 10A:
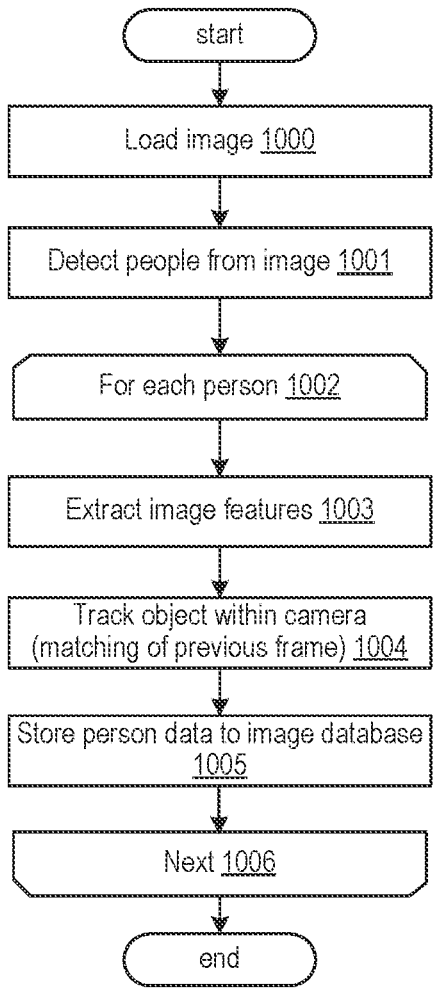
FIGS. 10(A) and 10(B) illustrate an overall system flow, in accordance with an example implementation.
Figure 10B:
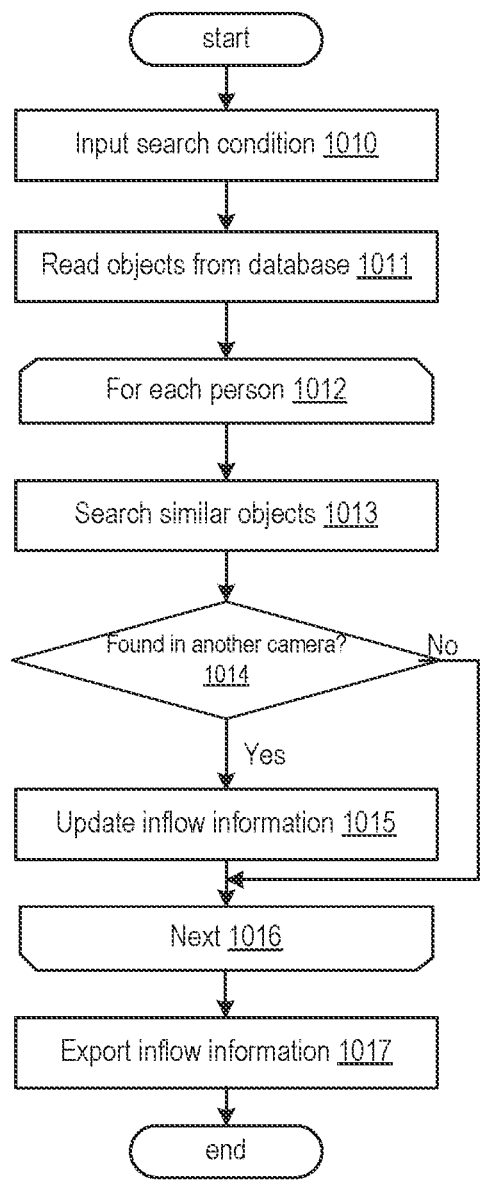

Inflow source estimation unit 711 is configured to estimate the inflow source from the image retrieving unit 710 through the techniques as illustrated in FIGS. 10(A) and 10(B).

Figure 8:
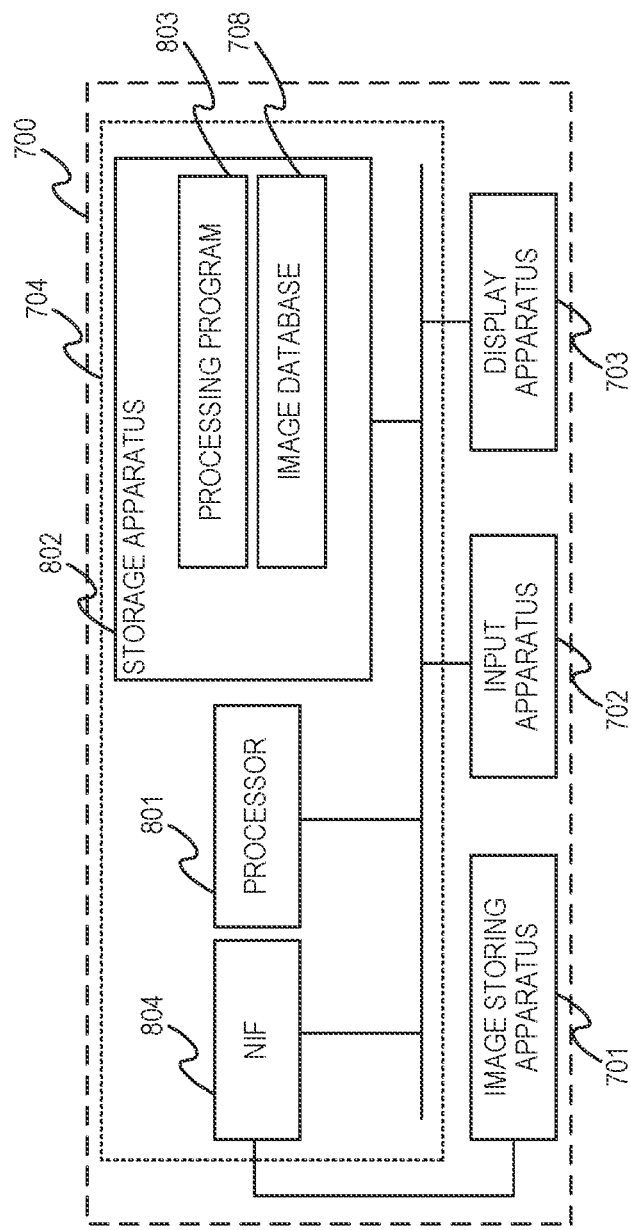
FIG. 8 illustrates a system hardware configuration, in accordance with an example implementation.

FIG. 8 illustrates a system hardware configuration, in accordance with an example implementation. In the example implementations of FIG. 8, there can be a system involving a computing device to facilitate the system configuration 700 (e.g., computer, laptop, etc.) having a hardware configuration 704 involving a storage apparatus 802. Computing device of the system configuration 700 can involve a network interface (NIF) 804 and one or more physical processors 801. Physical processors 801 can be in the form of hardware processors such as central processing units (CPUs). Storage apparatus 802 can be any form of storage in accordance with the desired implementation. Storage apparatus can include processing program 803 which is loaded and executed by the one or more physical processors to facilitate the example implementations described herein, as well as an image database 708 to manage the extracted features of corresponding images. Processing program 803 is configured to facilitate the functionality of the units illustrated in FIG. 7.

Figure 3:
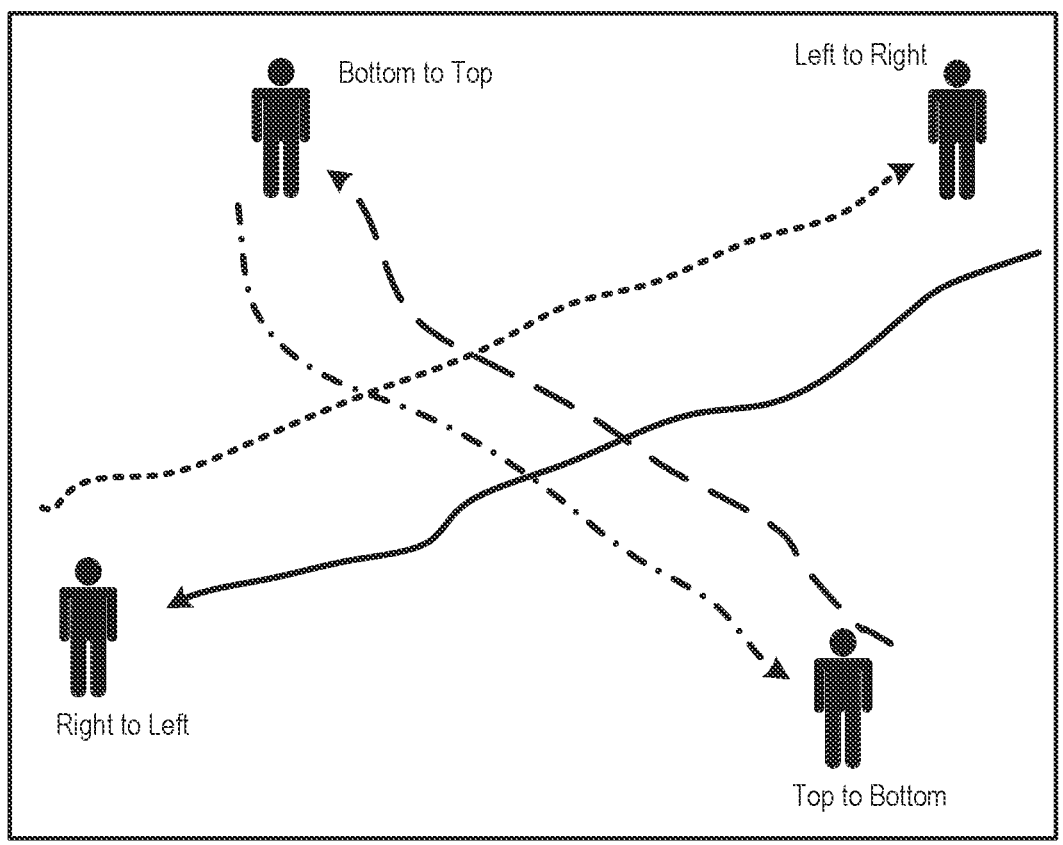
FIG. 3 illustrates an example of obtaining the direction of the trajectory from the coordinates of the start and end points of the tracking.
Figure 4:
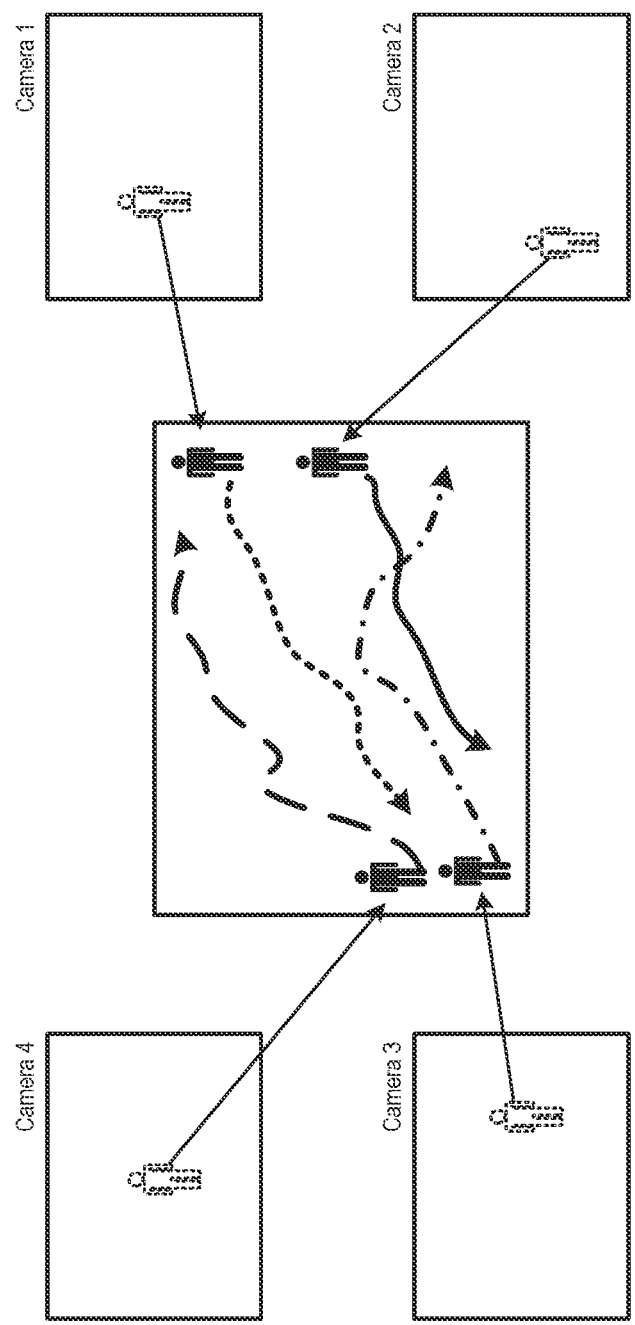
FIG. 4 illustrates the visualization of trajectories appearing in the central camera view according to the inflow sources, in accordance with an example implementation.
Figure 5:
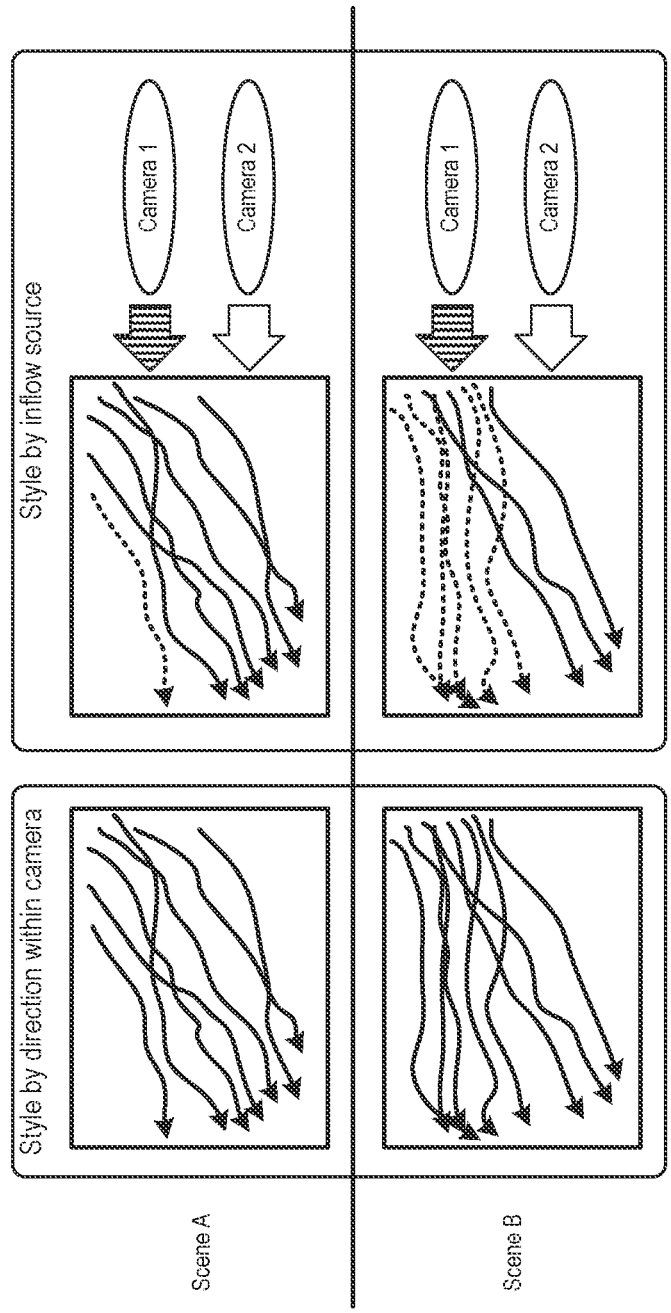
FIG. 5 illustrates detecting changes based on inflow sources, in accordance with an example implementation.

Processor(s) 801 can be configured to execute instructions involving detecting and tracking a plurality of persons from images from a plurality of cameras; extracting image features from the detected and tracked plurality of persons from the images from the plurality of cameras; storing the extracted image features with information associated with the plurality of cameras into a database; searching the database for each of the plurality of persons detected from images from another camera; for the each of the plurality of persons detected from the images from the another camera being within a threshold of similarity of the one of the plurality of persons from the images of one of the plurality of cameras: updating an inflow source estimation of the each of the plurality of persons based on a camera identifier of the one of the plurality of cameras, wherein the inflow source estimation is representative of a trajectory taken by the each of the plurality of persons from a first field of view of the one of the plurality of cameras through a second field of view of the another camera, as illustrated in FIGS. 9, 10(A) and 10(B). Accordingly, processor(s) 801 can be configured to execute instructions involving providing a visualization of the inflow source estimation of the each of the plurality of persons based on the camera identifier of the one of the plurality of cameras as illustrated in FIGS. 3 to 5.

Figure 11:
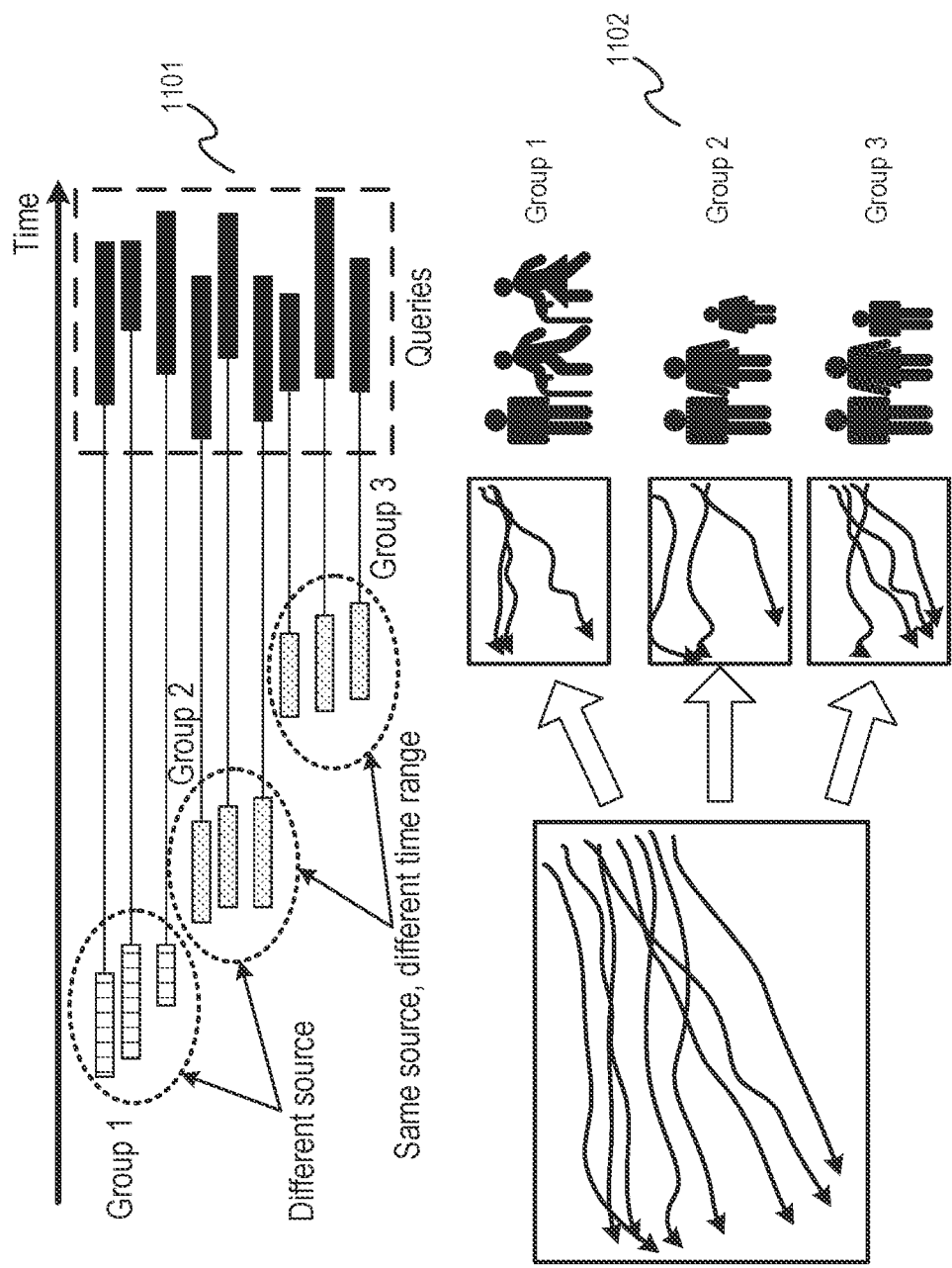
FIG. 11 illustrates an example of the crowd being segmented into several groups based on the inflow source information with tracking within the source camera, in accordance with an example implementation.

As illustrated in FIG. 11, processor(s) 801 can be configured to execute instructions involving grouping ones of the plurality of persons from the same ones of the plurality of cameras based on timeline information; and modifying the visualization according to the grouping of the ones of the plurality of persons from the same ones of the plurality of cameras based on timeline information. Further, processor(s) 801 can be configured to execute instructions involving forming the trajectory taken by the each of the plurality of persons based on the grouping as illustrated in FIG. 11.

In addition, as illustrated at 1102 of FIG. 11, the images of the persons or group of persons can also be provided if selected. Processor(s) 801 can be configured to provide the visualization of the inflow source estimation of the each of the plurality of persons based on the grouping, and for selection of an inflow source estimation associated with one of the plurality of persons, providing images of the one of the plurality of persons detected from the images from the another camera as illustrated at FIGS. 3 to 6 based on the group of FIG. 11.

Figure 12:
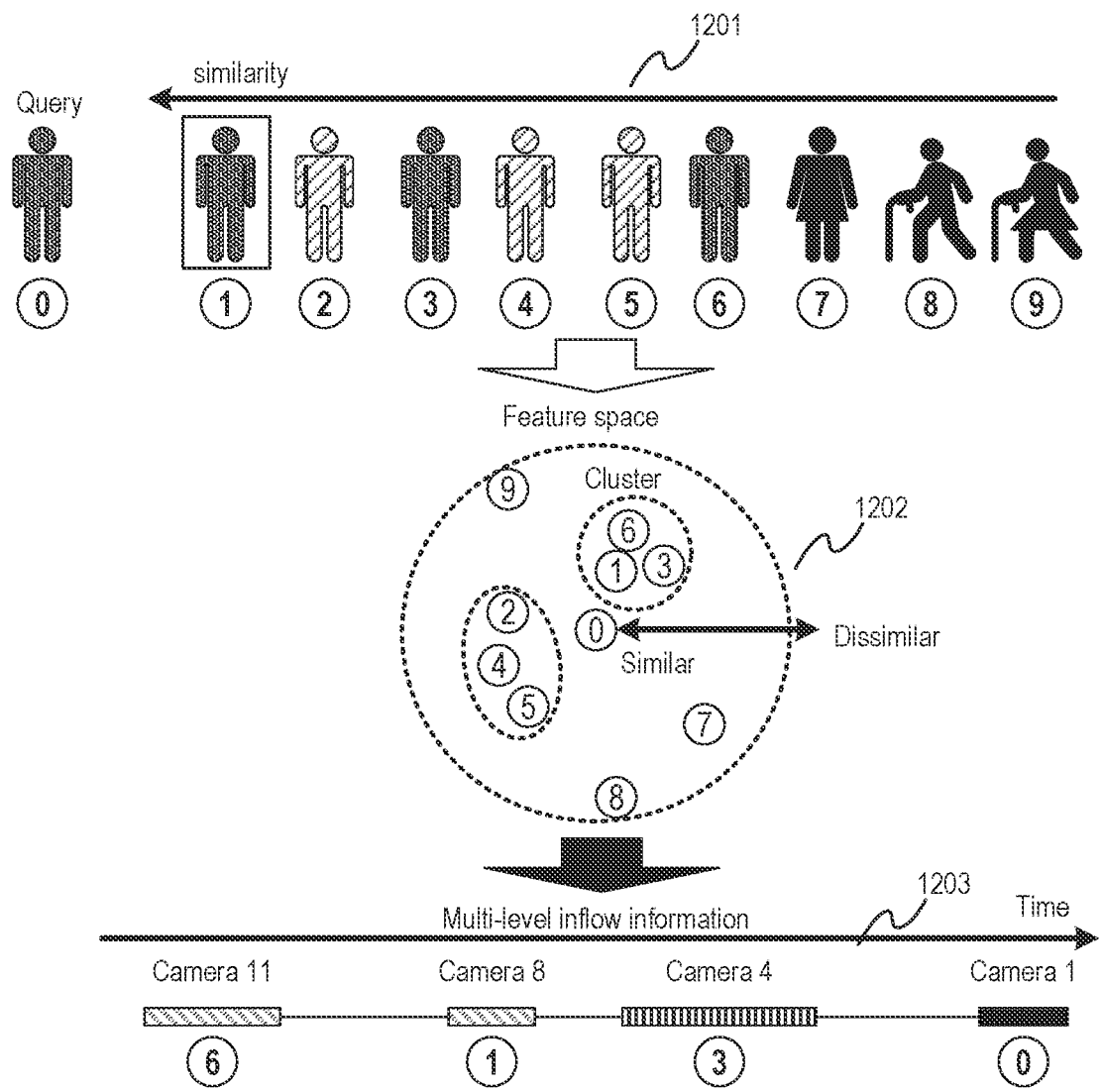
FIG. 12 illustrates the procedure for estimating path of the same person using the distribution in feature space, in accordance with an example implementation.

As illustrated in FIG. 12, processor(s) 801 can be configured to execute instructions including clustering search results from the searching the database based on feature similarity to form clusters; and identifying the each of the plurality of persons detected from the images from the another camera based on a closest cluster to the one of the plurality of persons from the images of the one of the plurality of cameras. In addition, as illustrated in FIG. 12, processor(s) 801 can be configured to execute instructions including using the closest cluster to track the each of the plurality of persons across multiple ones of the plurality of cameras and to form the inflow source estimation.

Figure 13:
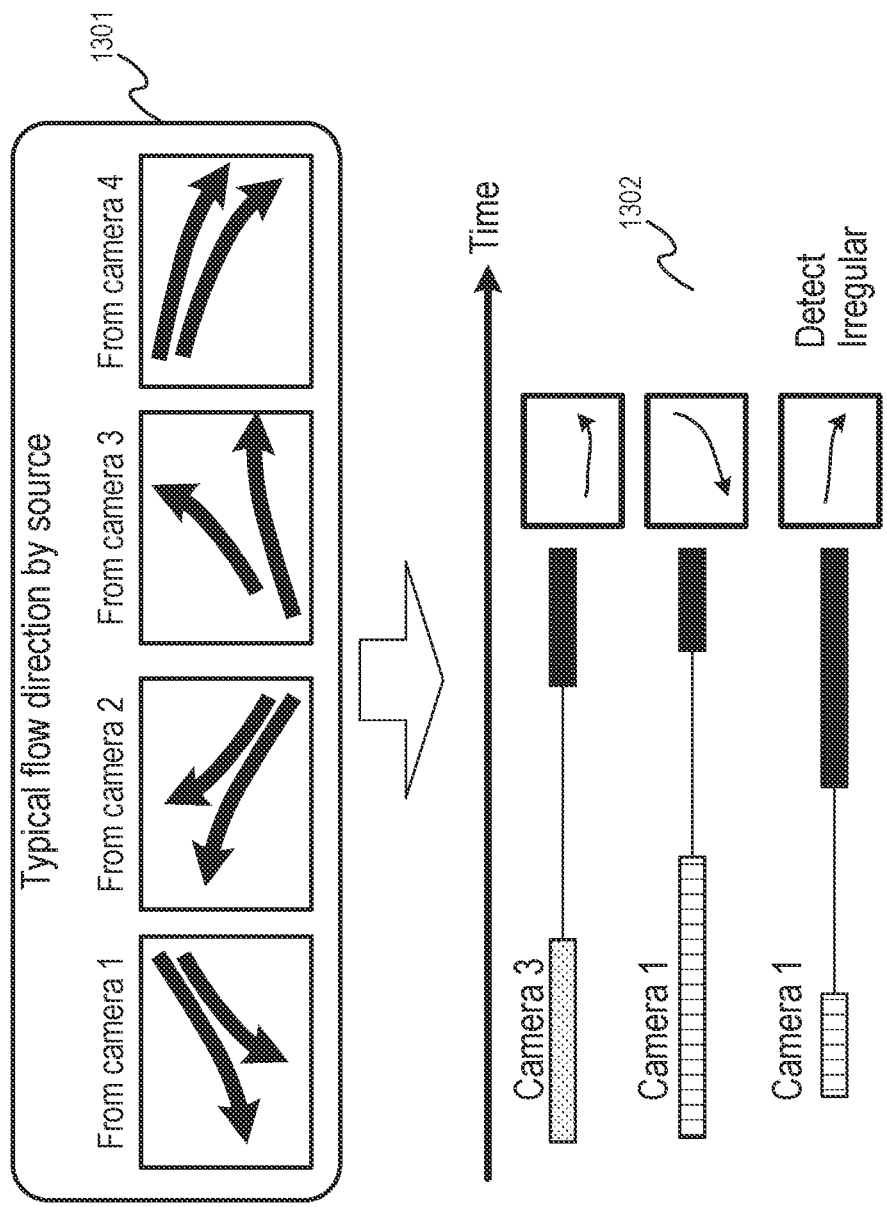
FIG. 13 illustrates irregular detection using correlation between trajectory direction and inflow source, in accordance with an example implementation.

As illustrated in FIG. 13, processor(s) 801 can be configured to execute instructions involving removing irregular trajectories from the inflow source estimation based on camera identifiers associated with the irregular trajectories.

FIG. 9 illustrates an image database configuration, in accordance with an example implementation. In the example implementation of FIG. 9, the image database can manage an object table for the images, with parameters such as the object identifier (ID), the image, the time stamp of the image in the video, the camera ID of the camera that captured the image, the trajectory ID of the trajectory taken by the image, coordinates of the images, extracted image features, and other derived attributes of the image in accordance with the desired implementation. The image database configuration can also involve a trajectory table, which manages a trajectory ID, the start time of the trajectory, the end time of the trajectory, the camera ID, and the object IDs associated with the trajectory.

FIGS. 10(A) and 10(B) illustrate an overall system flow, in accordance with an example implementation. Specifically, FIG. 10(A) illustrates the overall flow for the data registration, and FIG. 10(B) illustrates the overall flow for the inflow estimation.

At 1000, an image is loaded from the camera. At 1001, the flow executes a person detection process to detect people from the image through execution of person detection and tracing unit 706. At 1002, an iterative loop is executed for each person detected in the person detection process.

At 1003, the flow extracts image features and classifies the attributes through execution of the features extraction unit 707. At 1004, the object is tracked within the camera based on matching to the previous frame. At 1005, the person data, extracted image features, attributes, and trajectory data are stored in the image database 706 as illustrated in FIG. 9. At 1006, the loop is iterated back to 1002 for the next person.

With regards to the inflow estimation, at 1010, the search condition is input. At 1011, the objects are read in the database. At 1012, a loop is initiated for each person associated with an object in the database. At 1013, a search for similar objects is done. At 1014, a determination is made as to whether a similar object is found in another camera. If so (Yes), then the flow proceeds to 1015 to update the inflow information. At 1016, the loop is iterated back to 1012 for the next person.

The example implementations can also be extended to desired implementations. For example, FIG. 11 illustrates an example of the crowd being segmented into several groups based on the inflow source information with tracking within the source camera, in accordance with an example implementation. By using the inflow source information estimated from the example implementations described herein, it is possible to segment crowd into some groups and observe them. In this extension, the system obtains not only the camera information of search results but also tracking information within that camera.

In FIG. 11, search results are plotted on a timeline as shown at 1101. Each row represents a different person, and the length of the bar represents the time range captured by the camera. Bar color and style represents the camera from which the image was captured. If a result of the similar image search is determined to be the same person of the query, it is plotted in the same row.

By sorting timeline rows according to the camera and time range of inflow source, the system can segment query crowds to several groups as shown at 1102. In this example, not only can groups from different inflow source be separated, but it is also possible to separate groups that stayed at different time ranges even if they are from the same inflow source.

In a second extension, FIG. 12 illustrates the procedure for estimating path of the same person using the distribution in feature space, in accordance with an example implementation. The inflow source estimation of the example implementations can obtain movement information from adjacent cameras, but it cannot obtain movement via multiple points. It can be tracked by re-searching from adjacent cameras using the same procedure, but multi-stage search is computationally expensive.

In the extension illustrated in FIG. 12, similar-images including distant points are obtained in a single search. However, the wider the search range, the more similar others may be included in the search results, which may lead to the wrong inflow estimation. In order to improve the search accuracy, temporal constraints can be used according to camera location topologies or consistency of person appearance attributes.

In addition, distribution in the feature space can be used instead of simple similarity. FIG. 12 illustrates the procedure for estimating path of the same person using the distribution in feature space. In this example, when the search results are arranged in order of similarity 1201, multiple persons appear at the top rank of the search results, which results in incorrect inflow routes. To avoid this problem, the system uses not only similarity, but also a distribution on a feature space as shown at 1202. By plotting the search results on the feature space, a cluster of results can be obtained. By using only the results in the nearest cluster as shown at 1203, example implementations can estimate more reliable multi-stage inflow routes than those using simple similarity.

In a third extension, by using inflow source estimation and accumulating trajectories in a camera view for each inflow source, typical trajectories can be obtained for inflow source. FIG. 13 illustrates irregular detection using correlation between trajectory direction and inflow source, in accordance with an example implementation. This statistical data as shown at 1301 can be used to detect trajectories that are different from the norm. When accumulating statistical information 1301, only the inflow source estimation results with high reliability are used. In FIG. 13, when estimating the inflow source, results that deviate from typical trajectories are detected using statistical information accumulated in the past as shown at 1302. This makes it possible to exclude erroneous inflow source estimation results.

Example implementations described herein allow for the integration and analysis of movements of crowds in a wide area using inflow source estimation and trajectories within a camera. The example implementations can be applied to the following use cases, such as security planning of police departments, urban planning in public administration, optimization of attractions in resort parks, or optimization of product shelves in retail stores.

Some portions of the detailed description are presented in terms of algorithms and symbolic representations of operations within a computer. These algorithmic descriptions and symbolic representations are the means used by those skilled in the data processing arts to convey the essence of their innovations to others skilled in the art. An algorithm is a series of defined steps leading to a desired end state or result. In example implementations, the steps carried out require physical manipulations of tangible quantities for achieving a tangible result.

Unless specifically stated otherwise, as apparent from the discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer-readable storage medium or a computer-readable signal medium. A computer-readable storage medium may involve tangible mediums such as, but not limited to optical disks, magnetic disks, read-only memories, random access memories, solid state devices and drives, or any other types of tangible or non-transitory media suitable for storing electronic information. A computer readable signal medium may include mediums such as carrier waves. The algorithms and displays presented herein are not inherently related to any particular computer or other apparatus. Computer programs can involve pure software implementations that involve instructions that perform the operations of the desired implementation.

Various general-purpose systems may be used with programs and modules in accordance with the examples herein, or it may prove convenient to construct a more specialized apparatus to perform desired method steps. In addition, the example implementations are not described with reference to any particular programming language. It will be appreciated that a variety of programming languages may be used to implement the teachings of the example implementations as described herein. The instructions of the programming language(s) may be executed by one or more processing devices, e.g., central processing units (CPUs), processors, or controllers.

As is known in the art, the operations described above can be performed by hardware, software, or some combination of software and hardware. Various aspects of the example implementations may be implemented using circuits and logic devices (hardware), while other aspects may be implemented using instructions stored on a machine-readable medium (software), which if executed by a processor, would cause the processor to perform a method to carry out implementations of the present application. Further, some example implementations of the present application may be performed solely in hardware, whereas other example implementations may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

Moreover, other implementations of the present application will be apparent to those skilled in the art from consideration of the specification and practice of the teachings of the present application. Various aspects and/or components of the described example implementations may be used singly or in any combination. It is intended that the specification and example implementations be considered as examples only, with the true scope and spirit of the present application being indicated by the following claims.

What is claimed is:

1. A method, comprising:
   detecting and tracking a plurality of persons from multiple images of the persons obtained from each of a plurality of cameras;
   extracting image features from the detected and tracked plurality of persons from the multiple images from the each of the plurality of cameras;
   storing the extracted image features with information associated with the plurality of cameras into a database;
   searching the database for each of the plurality of persons detected from a plurality of images from another camera;
   for the each of the plurality of persons detected from the plurality of images from the another camera being within a threshold of similarity of the one of the plurality of persons from the multiple images of one of the plurality of cameras:
      updating an inflow source estimation of the each of the plurality of persons based on a camera identifier of the one of the plurality of cameras, wherein the inflow source estimation is representative of a trajectory taken by the each of the plurality of persons from a first field of view of the one of the plurality of cameras through a second field of view of the another camera; and
      providing a visualization of the inflow source estimation of the each of the plurality of persons based on the camera identifier of the one of the plurality of cameras, wherein the visualization of the inflow source estimation comprises a plurality of plotted trajectories and a plurality of timeline rows, each of the plurality of plotted trajectories and each of the plurality of timeline rows represents a person of the plurality of persons, and each of the plurality of timeline rows comprises at least one visualized bar having a bar length that represents a camera-captured time range and positioned along a time axis; and
   detecting irregular trajectories using correlation between trajectory direction and the inflow source estimation, wherein the irregular trajectories are trajectories that differ from trajectorial norms of the inflow source estimation.

2. The method of claim 1, further comprising grouping ones of the plurality of persons from the same ones of the plurality of cameras based on timeline information; and
   modifying the visualization according to the grouping of the ones of the plurality of persons from the same ones of the plurality of cameras based on timeline information.

3. The method of claim 2, further comprising forming the trajectory taken by the each of the plurality of persons based on the grouping.

4. The method of claim 2, wherein the providing the visualization of the inflow source estimation of the each of the plurality of persons is based on the grouping, and
wherein the method further comprises, for selection of an inflow source estimation associated with one of the plurality of persons, providing images of the one of the plurality of persons detected from the images from the another camera.

5. The method of claim 1, further comprising:
clustering search results from the searching the database based on feature similarity to form clusters; and
identifying the each of the plurality of persons detected from the images from the another camera based on a closest cluster to the one of the plurality of persons from the images of the one of the plurality of cameras.

6. The method of claim 5, further comprising using the closest cluster to track the each of the plurality of persons across multiple ones of the plurality of cameras and to form the inflow source estimation.

7. The method of claim 1, further comprising removing the irregular trajectories from the inflow source estimation based on camera identifiers associated with the irregular trajectories.

8. A non-transitory computer readable medium, storing instructions for executing a process, the instructions comprising:
detecting and tracking a plurality of persons from multiple images of the persons obtained from each of a plurality of cameras;
extracting image features from the detected and tracked plurality of persons from the multiple images from the each of the plurality of cameras;
storing the extracted image features with information associated with the plurality of cameras into a database;
searching the database for each of the plurality of persons detected from a plurality of i ages from another camera;
for the each of the plurality of persons detected from the plurality of images from the another camera being within a threshold of similarity of the one of the plurality of persons from the multiple images of one of the plurality of cameras:
updating an inflow source estimation of the each of the plurality of persons based on a camera identifier of the one of the plurality of cameras, wherein the inflow source estimation is representative of a trajectory taken by the each of the plurality of persons from a first field of view of the one of the plurality of cameras through a second field of view of the another camera; and
providing a visualization of the inflow source estimation of the each of the plurality of persons based on the camera identifier of the one of the plurality of cameras, wherein the visualization of the inflow source estimation comprises a plurality of plotted trajectories and a plurality of timeline rows, each of the plurality of plotted trajectories and each of the plurality of timeline rows represents a person of the plurality of persons, and each of the plurality of timeline rows comprises at least one visualized bar having a bar length that represents a camera-captured time range and positioned along a time axis; and
detecting irregular trajectories using correlation between trajectory direction and the inflow source estimation,
wherein the irregular trajectories are trajectories that differ from trajectorial norms of the inflow source estimation.

9. The non-transitory computer readable medium of claim 8, the instructions further comprising grouping ones of the plurality of persons from the same ones of the plurality of cameras based on timeline information; and
modifying the visualization according to the grouping of the ones of the plurality of persons from the same ones of the plurality of cameras based on timeline information.

10. The non-transitory computer readable medium of claim 9, the instructions further comprising forming the trajectory taken by the each of the plurality of persons based on the grouping.

11. The non-transitory computer readable medium of claim 9, wherein the providing the visualization of the inflow source estimation of the each of the plurality of persons is based on the grouping, and
wherein, for selection of an inflow source estimation associated with one of the plurality of persons, images of the one of the plurality of persons detected from the images from the another camera are provided.

12. The non-transitory computer readable medium of claim 8, the instructions further comprising:
clustering search results from the searching the database based on feature similarity to form clusters; and
identifying the each of the plurality of persons detected from the images from the another camera based on a closest cluster to the one of the plurality of persons from the images of the one of the plurality of cameras.

13. The non-transitory computer readable medium of claim 12, further comprising using the closest cluster to track the each of the plurality of persons across multiple ones of the plurality of cameras and to form the inflow source estimation.

14. The non-transitory computer readable medium of claim 8, further comprising removing the irregular trajectories from the inflow source estimation based on camera identifiers associated with the irregular trajectories.

15. An apparatus, comprising:
a processor, configured to:
detect and track a plurality of persons from multiple images of the persons obtained from each of a plurality of cameras;
extract image features from the detected and tracked plurality of persons from the multiple images from the each of the plurality of cameras;
store the extracted image features with information associated with the plurality of cameras into a database;
search the database for each of the plurality of persons detected from a plurality of images from another camera;
for the each of the plurality of persons detected from the plurality of images from the another camera being within a threshold of similarity of the one of the plurality of persons from the multiple images of one of the plurality of cameras:
update an inflow source estimation of the each of the plurality of persons based on a camera identifier of the one of the plurality of cameras, wherein the inflow source estimation is representative of a trajectory taken by the each of the plurality of persons from a first field of view of the one of the plurality of cameras through a second field of view of the another camera; and provide a visualization of the inflow source estimation of the each of the plurality of persons based on the camera identifier of the one of the plurality of cameras, wherein the visualization of the inflow source estimation comprises a plurality of plotted trajectories and a plurality of timeline rows, each of the plurality of plotted trajectories and each of the plurality of timeline rows represents a person of the plurality of persons, and each of the plurality of timeline rows comprises at least one visualized bar having a bar length that represents a camera-captured time range and positioned along a time axis; and detect irregular trajectories using correlation between trajectory direction and the inflow source estimation, wherein the irregular trajectories are trajectories that differ from trajectorial norms of the inflow source estimation.

\* \* \* \* \*